No. 848,209. PATENTED MAR. 26, 1907.
J. ROSSIGER.
COOKING UTENSIL.
APPLICATION FILED NOV. 12, 1906.

Witnesses
F. A. Barron.
M. A. Schmidt

Inventor
Jessie Rossiger.
By Milo B. Stevens & Co.
Attorneys.

UNITED STATES PATENT OFFICE.

JESSIE ROSSIGER, OF GOLCONDA, ILLINOIS.

COOKING UTENSIL.

No. 848,209.   Specification of Letters Patent.   Patented March 26, 1907.

Application filed November 12, 1906. Serial No. 343,049.

*To all whom it may concern:*

Be it known that I, JESSIE ROSSIGER, a citizen of the United States, residing at Golconda, in the county of Pope and State of Illinois, have invented new and useful Improvements in Cooking Utensils, of which the following is a specification.

This invention is a cooking utensil, and more particularly one for cooking hominy, the object being to provide a utensil in which the hominy will not burn and also a stirring device.

Figure 1:
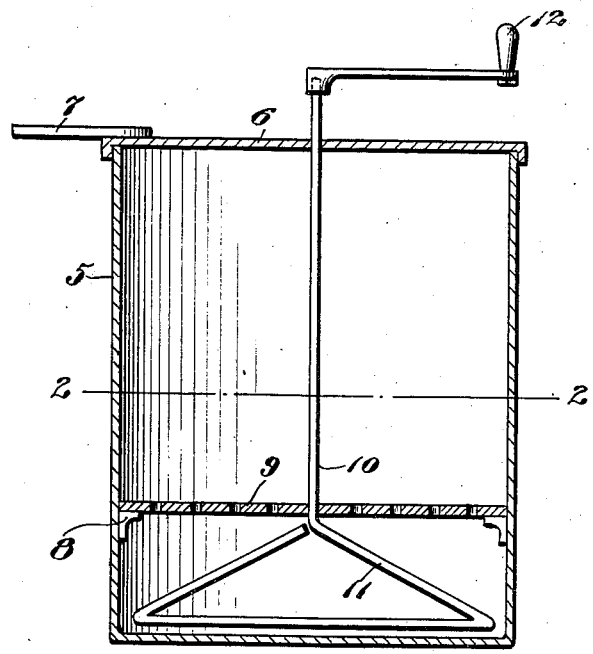
Figure 2:
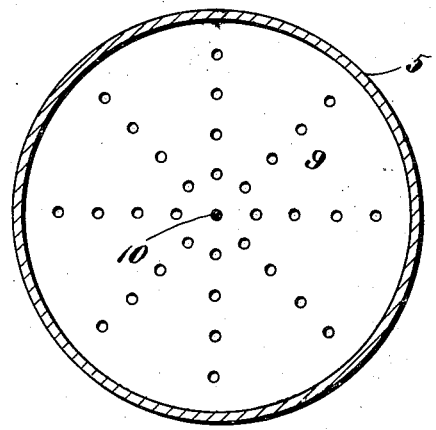

In the accompanying drawing, Figure 1 is a vertical sectional view of the invention. Fig. 2 is a horizontal section on the line 2 2 of Fig. 1.

Referring specifically to the drawing, 5 denotes a pot, which may be of any desired size and shape and has a tight-fitting cover 6, provided with a handle 7. Inside the pot, near the bottom thereof, are brackets 8, on which a perforated disk or screen 9 is supported.

The stirring device comprises a shank 10, extending through openings in the cover and screen, and below the latter are beater-arms 11, extending from the shank. The stirrer is preferably a single piece of wire bent at one end to form the arms 11. The shank extends outside the cover and has a squared end to receive a handle 12, which is removable to enable the stirrer to be placed in position inside the pot, as shown in Fig. 1.

Although the utensil herein described is adapted for various uses, it is intended particularly for cooking hominy, which is difficult to cook without burning and scorching it unless it is continually stirred. With the present utensil the hominy is placed on the screen, and all that is required is to keep sufficient water in the pot. Should any particles of hominy fall through the plate, the stirrer will prevent them from sticking to the bottom of the pot and burning. All that is necessary is to give the stirrer a turn occasionally, and this can be done without removing the lid from the pot. Without the stirrer there would be no way to prevent the particles which may fall below the plate from sticking to the bottom of the pot and burning.

I claim—

1. A cooking utensil comprising a pot, a perforated plate inside the pot near the bottom thereof, and a stirrer below the plate.

2. A cooking utensil comprising a pot having a lid, and a screen inside the pot near the bottom thereof, in combination with a stirrer comprising a shank extending through the lid and screen, and having beater-arms below the latter.

3. A cooking utensil comprising a pot having a lid, brackets inside the pot, and a perforated plate removably supported on the brackets, in combination with a stirrer comprising a shank extending through the lid and plate, and having beater-arms below the latter.

In testimony whereof I have signed my name to this specification in the presence of two subscribing witnesses.

JESSIE ROSSIGER.

Witnesses:
 J. O. WILLIAMSON,
 SARAH COSSEY.